US010328871B2

(12) United States Patent
Faik et al.

(10) Patent No.: US 10,328,871 B2
(45) Date of Patent: Jun. 25, 2019

(54) PANEL FOR A VEHICLE INTERIOR

(71) Applicant: Faurecia Innenraum Systeme GmbH, Hagenbach (DE)

(72) Inventors: Othmane Faik, La Wantzeanu (FR); Stephen Bellagamba, Strasbourg (FR); Guillaume Basquin, Wissembourg (FR); Jan Koerner, Kieselbronn (DE); Henning Bein, Tiefenbronn (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 0 days.

(21) Appl. No.: 15/718,854

(22) Filed: Sep. 28, 2017

(65) Prior Publication Data
US 2018/0111569 A1 Apr. 26, 2018

(30) Foreign Application Priority Data

Sep. 29, 2016 (DE) .......................... 10 2016 218 916

(51) Int. Cl.
*B60R 13/02* (2006.01)
*B60K 35/00* (2006.01)
*B60Q 3/54* (2017.01)

(52) U.S. Cl.
CPC .......... *B60R 13/0262* (2013.01); *B60K 35/00* (2013.01); *B60Q 3/54* (2017.02); *B60R 13/02* (2013.01); *B60K 2350/106* (2013.01); *B60K 2350/925* (2013.01); *B60R 2013/0287* (2013.01)

(58) Field of Classification Search
CPC ................ B60R 13/0262; B60R 13/02; B60R 2013/0287; B60Q 3/54; B60K 35/00; B60K 2350/106; B60K 2350/925

USPC ....................................... 296/1.08, 146.7, 70
See application file for complete search history.

(56) References Cited

U.S. PATENT DOCUMENTS

| 8,202,616 B2 | 6/2012 | Suzuki et al. | |
| 10,065,576 B2 | 9/2018 | Faik et al. | |
| 2009/0201436 A1* | 8/2009 | Strazzanti ............. | B60K 35/00 349/16 |
| 2009/0268278 A1 | 10/2009 | Suzuki et al. | |

(Continued)

FOREIGN PATENT DOCUMENTS

| DE | 19928235 A1 | 4/2000 |
| DE | 202006002835 U1 | 9/2006 |

(Continued)

OTHER PUBLICATIONS

Extended European Search Report issued in EP Application No. 18175285.8 [with Google machine translation], completed Oct. 17, 2018, 14 pages.

(Continued)

*Primary Examiner* — Jason S Morrow
*Assistant Examiner* — E Turner Hicks
(74) *Attorney, Agent, or Firm* — Faegre Baker Daniels LLP

(57) ABSTRACT

A panel for a vehicle interior including a cover layer and a mask layer, wherein the cover layer has a frontside and a backside, and the mask layer is disposed at the backside of the cover layer. The cover layer includes a semi-transparent layer. The cover layer has a light transmittance of at most 90 percent in a direction perpendicular to the frontside, wherein the mask layer comprises a transparent display region and an opaque region, wherein the opaque region is located adjacent to the display region.

11 Claims, 5 Drawing Sheets

(56) References Cited

U.S. PATENT DOCUMENTS

| | | | |
|---|---|---|---|
| 2010/0144980 A1 | 6/2010 | Fujibayshi et al. | |
| 2011/0287230 A1 | 11/2011 | Akuzawa et al. | |
| 2014/0050886 A1 | 2/2014 | Burgin et al. | |
| 2015/0291085 A1* | 10/2015 | Manning | B60Q 1/2619 362/516 |
| 2015/0321434 A1 | 11/2015 | Sterman et al. | |
| 2016/0229991 A1 | 8/2016 | Diez Diaz et al. | |
| 2016/0280128 A1* | 9/2016 | Cannon | B60R 13/0262 |
| 2016/0375843 A1 | 12/2016 | Faik et al. | |
| 2018/0050948 A1 | 2/2018 | Faik et al. | |
| 2018/0345879 A1 | 12/2018 | Chapeau et al. | |

FOREIGN PATENT DOCUMENTS

| | | |
|---|---|---|
| DE | 102013214108 A1 | 2/2015 |
| DE | 102014107098 A1 | 11/2015 |
| DE | 102014011230 A1 | 1/2016 |
| DE | 102015105694 A | 10/2016 |
| EP | 1305189 B1 | 5/2003 |
| WO | WO02057374 A1 | 7/2002 |
| WO | WO2015188017 A1 | 12/2015 |
| WO | 2016024029 A1 | 2/2016 |

OTHER PUBLICATIONS

German Search Report issued in DE Application No. 10 2017 209457.5 [with Google machine translation], dated Apr. 19, 2018, 20 pages.

\* cited by examiner

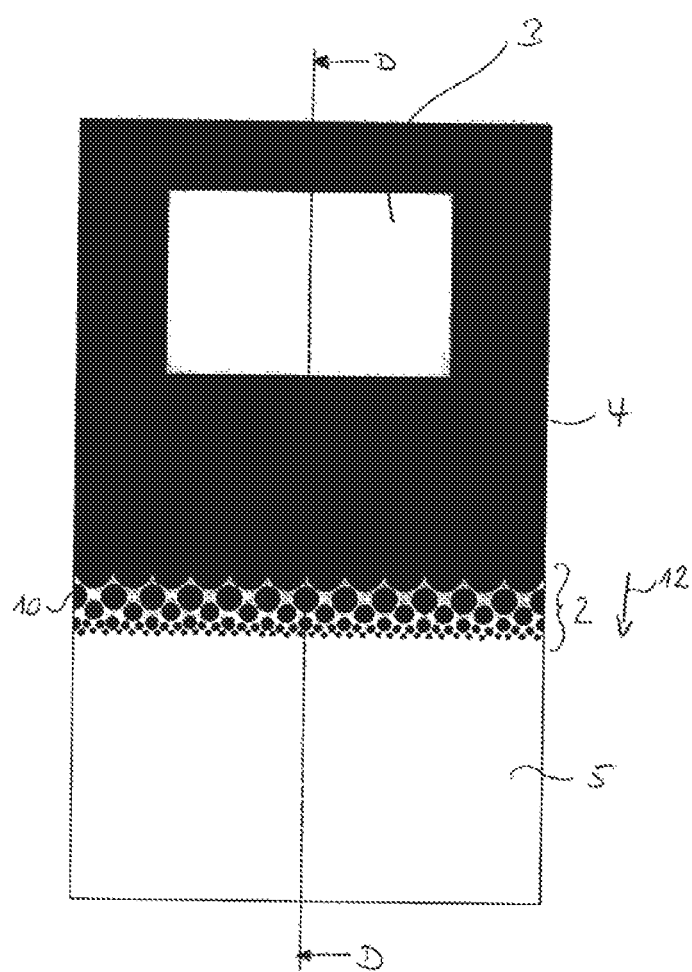
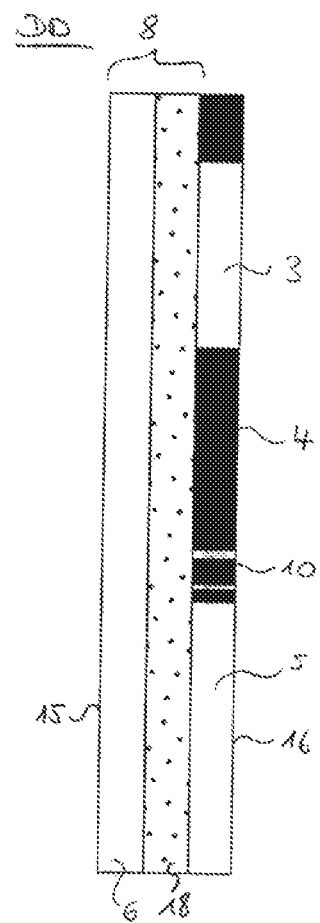

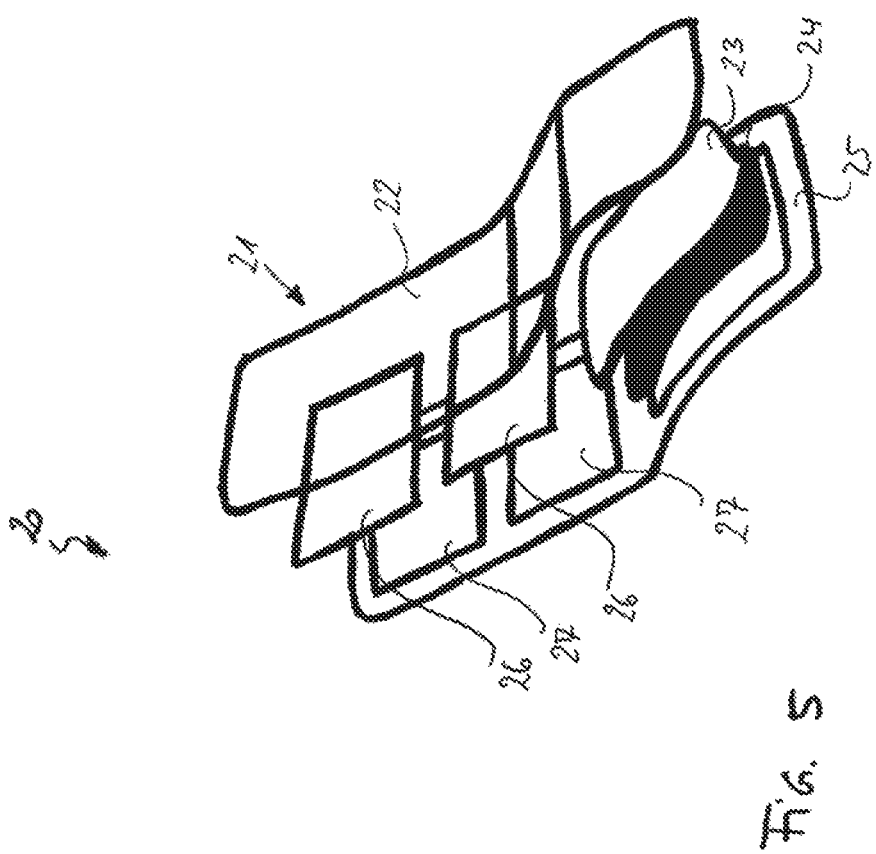

PANEL FOR A VEHICLE INTERIOR

CROSS-REFERENCE TO RELATED APPLICATION

This application claims priority to German Application No. 10 2016 218 916.6, filed Sep. 29, 2016, which is herein incorporated by reference in its entirety.

TECHNICAL FIELD

The application relates to a panel for a vehicle interior.

BACKGROUND

It is known to use decorative panels with luminous elements in vehicle interiors. For example, document WO 2016/024029 A1 relates to a decorative trim part with a luminous design for the interior of motor vehicles. This decorative trim part comprises a decorative lining on which a luminous design is produced comprising a luminous region. The decorative lining comprises a perforated opaque layer, covering the luminous region for defining a sharp outline of the luminous region permitting a visual identification of this luminous region.

In today's automotive industry, displays are increasingly used in the vehicle interior, for example for information or entertainment systems. As a consequence, there is an increased need for implementing displays in a decorative way. Additionally, the display must not distract the driver from his driving task. Thus, the information on the display has to be clearly presented so that the driver is able to register the information rapidly. It is known that displays are surrounded by a coloured decorative element and covered by a plastic layer. The plastic layer is also covering the surrounding of the display. By performing a colour matching between the colour of the display and the colour of the coloured decorative element, the display is almost invisible once it is turned-off. This results in an aesthetic appearance. However, the above described solution has a plastic surface that has deficiencies in optical and haptic appearance. Further, the display is arranged next to the decorative material. Thus, a decorative element can distract the driver from his driving task. Furthermore, the edges of the display are not completely hidden and can be perceived also in a turned-off mode of the display.

SUMMARY

In view of the aforementioned aspects, it is an object of the present application to suggest an improved panel for a vehicle interior. In particular, it is an object of the present application to improve vehicle safety. Furthermore, it is an object of the present application to provide a panel for a vehicle interior that complies with a highest standard of aesthetics. Further, it is an object of the present application to reduce the risk of breakage of functional elements disposed in a vehicle interior.

The proposed panel for a vehicle interior comprises a cover layer and a mask layer. The cover layer typically has a thickness of at least 0.2 mm, preferably 2 mm, more preferably 5 mm and/or a thickness of typically at most 10 mm, preferably at most 5 mm, more preferably at most 3 mm. The cover layer has a frontside and a backside and the mask layer is disposed at the backside of the cover layer.

The cover layer comprises a semi-transparent layer. The cover layer has a light transmittance of at most 90 percent, preferably a light transmittance of at most 80 percent, most preferably a light transmittance of at most 60 percent, in a direction perpendicular to the frontside. The light transmittance is the proportion of visible light at near normal incidence that is transmitted through a layer and can be measured according to DIN EN 410 or DIN EN 133363 or LAH 1K0 947 (VW® spec).

In embodiments, the semi-transparent layer has a light transmittance of less than 90 percent.

When a light ray strikes the cover layer, in particular the semi-transparent layer, essentially perpendicular to its surface, i.e., with an angle of incidence of essentially 0 degree (near normal incidence), the cover layer, in particular the semi-transparent layer, absorbs and/or reflects a fraction of the light. The angle of incidence is defined between a surface normal and an incident beam. In embodiments the transmittance is to be understood as the ratio of the transmitted intensity and the initial intensity for a light wave length of 500 nm. The cover layer, in particular the semi-transparent layer, absorbs and/or reflects a fraction of light that is striking the front- or the backside of the cover layer, in particular the semi-transparent layer. Preferably, at most 8 percent, preferably at most 2 percent of the incident perpendicular light rays that strike a surface of the cover layer (or the semi-transparent layer) are reflected at each surface of the cover layer (or the semi-transparent layer). As the incident beam deviates from the normal, the surface reflectance increases. A light ray that strikes a surface of the cover layer at a critical angle will not be transmitted but will be essentially totally reflected. The critical angle is to be understood as the angle between the surface normal and the incident beam. The critical angle is at 39 degree or greater, preferably at 42 degree or greater.

The intended light transmittance of the cover layer is achieved by using a certain material for the cover layer and the semi-transparent layer such as a clear tinted or coloured glass, a foil or a plastic such as PP, PP blends or the like, for example, a Prestige foil by 3M™. In other examples the semi-transparent layer can consist of a layer of adhesive. The semi-transparent layer typically has a thickness of at least 0.1 mm, preferably 0.15 mm, more preferably 0.125 mm and/or a thickness of at most 2 mm, preferably at most 1.5 mm, more preferably at most 1 mm.

The cover layer, in particular the semi-transparent layer, of the panel may have a light transmittance of at least 20 percent, preferably at least 30 percent in the direction essentially perpendicular to the frontside of the semi-transparent layer. A low light transmittance may ensure that the edges of the functional element, for example, the display disposed underneath the display region, may not be visible when viewed from the frontside. This results in reduced distraction during driving when the driver is provided with displayed information.

The mask layer comprises a transparent display region and an opaque region. The opaque region is located adjacent to the display region. Preferably, the opaque region surrounds the display region. The opaque region may be formed by mass tinting a material of the mask layer or any other colouring method to achieve an opaque region. The mask layer typically has a thickness of at least 0.01 mm, preferably 0.02 mm, more preferably 0.05 mm and/or a thickness of at most 10 mm, preferably at most 5 mm, more preferably at most 1 mm. In some embodiments, the mask layer is a coated foil or a varnish, optionally including cut-outs. In other embodiments, the mask layer is printed on the backside of the semi-transparent layer, optionally directly on the backside of the semi-transparent layer.

The display region may be formed by an opening or transparent material so that the mask layer essentially may not absorb light in the display region. Therefore, a display disposed underneath the display region may not need to be operated with high light intensity to provide the driver with clearly visible information. The lower light intensity results in less electrical energy consumed and electricity may be saved. However, light from the display may still be absorbed in the cover layer and/or the semi-transparent layer which may be disposed on top of the display.

The suggested panel has the advantage that a functional element, for example, a display disposed at the backside of the cover layer is hidden or not visible when looking from the frontside of the cover layer when the display is in the off state and not emitting light. A light ray that strikes the frontside of the cover layer passes the cover layer and the cover layer absorbs a fraction of the light. The light ray impinges on the functional element, for example a display that is disposed underneath the display region. The light ray is reflected by or scattered from the display and passes the cover layer in a direction from the backside towards the frontside of the cover layer and the cover layer absorbs another fraction of the light. The material of the cover layer has the above mentioned light transmittance. Thus, the light ray, as viewed from the frontside, has a low intensity and the edge of the display is not visible.

When Information is provided by a light source disposed behind the panel, for example, a display, the light ray of the light source passes through the cover layer only once. A light intensity of a display is typically relatively high so that the information displayed is provided clearly and visually separated from display surrounding elements despite the cover layer. Thus, information is provided without distracting the driver's attention and improves the driving safety.

As mentioned, the suggested cover layer may comprise more than one layer. A layer covering the semi-transparent layer on the frontside may be made of glass such that the semi-transparent layer may be situated between a glass layer and the mask layer. The semi-transparent layer may consist of glass. The glass may have a colour. Glass has a high-quality in an optical and haptic appearance, for example, a smooth surface and a brilliant look. Therefore, glass is particularly suitable for highest aesthetical requirements, for example, in a vehicle interior of a luxury car. Furthermore, a surface made of glass may protect a functional element disposed underneath, for example, a display, from food or beverage spills or from scratches. Additionally, glass is easy to clean and does not require special cleaning products but can be cleaned using cheap household remedies like customary glass cleaner.

The panel may be a curved or a bent panel. In some embodiments, at least one layer of the cover layer may be bent by cold forming. Especially a layer made of glass may be bent by cold forming. A cold forming process is typically fast and energy efficient and therefore helps to reduce costs of production. Further, a cold forming process facilitates a production process as functional elements can be attached to the panel prior to bending and the temperature may not exceed the degradation temperature of the functional elements.

In some embodiments, at least one layer of the cover layer may be bent by hot forming. A hot formed element has the advantage, that is does not need to be held in shape by, for example, a carrier or holding element, to prevent the panel or a layer of the panel from regaining its initial shape.

In some embodiments, the mask layer may comprise a transparent region and a transition region. The transition region may be disposed between the transparent region and the opaque region. The light transmittance normal to the surface may increase in the transition region in a direction from the opaque region towards the transparent region. The transition region may contain both, opaque and transparent, areas. The transparent areas may be formed in the same way as the transparent regions and/or made of the same material. The opaque areas may be made of the same material as the opaque regions. The opaque areas may also be realized by mass tinting a material of the mask layer or by any other colouring method to achieve an opaque area. The transition region may also be formed by a combination of openings or cut-outs and opaque areas or by opaque areas and transparent areas formed by a transparent material. Thereby, the opaque region and the transition region may create a separating region between the display region and the transparent region. Thus, decorative elements surrounding the display region can be used for decorating the displays surrounding without distracting the driver's attention as the displayed information are visually separated by the transition region. A transition formed by, for example, a varnish, enables a compact construction and saving costs as opposed to an extra layer material, for example a plastic layer, with a higher thickness than a varnish and additional material costs.

In some embodiments, the transition region may comprise a gradual transition. A gradual transition can be defined by a continuously opaque surface featuring discretized see-through areas. A gradual transition has the advantage of a high aesthetical appearance and may guide the driver's view to focus the important information provided by the display or any other functional element.

In some embodiments, the panel may comprise a carrier. A carrier may function as a holding element that may fix the semi-transparent layer and/or the cover layer. The carrier may also fix the cold bent layer. The cover layer or any other layer may be fixed to the carrier or any other layer with a structural glue. The cover layer or any other layer may be fixed to the carrier or at any other layer with an optically clear adhesive. The carrier may be transparent. This has the advantage that decorative elements can be disposed behind the carrier to achieve a high aesthetical appearance. Additionally, the driver may be able to watch the road through the transparent carrier. The carrier may be made of plastic such as ABS/PC, PP, PP blends or the like, aluminium, or any other suitable material.

The panel may comprise a decorative layer that is arranged at the backside of the panel, for example underneath the transparent regions and/or the transitions region of the mask layer. The decorative layer may comprise a decorative region with one or more decorative materials like leather, textile, wood, a pattern or any other decorative material. The transition region may separate the decorative region from the display region. The decorative layer and/or some of the decorative regions may be visible when viewed from the front. The decorative area could also be used without a decorative material, making the area see-through for aesthetic purposes.

The panel may be used in a vehicle interior. The panel may be a part of a centre console, may form the outer boundary of a centre console or may be a centre console. The panel may comprise a display disposed underneath the display region. The panel may include throughholes or cut-outs for receiving control knobs, such as air conditioning knobs, switches, for example, for a hazard warning, or ashtrays.

The disclosure also relates to a vehicle trim part that may comprise a panel of any of the claims or includes a combination of features described herein.

BRIEF DESCRIPTION OF THE DRAWINGS

Exemplary embodiments will be described in conjunction with the following figures.

FIG. 4(a) shows a top view of a panel for a vehicle interior with a transition region according to embodiments of the disclosure, FIG. 4(b) shows a cross section of the panel of FIG. 4(a) with the transition region according to embodiments of the disclosure, and FIG. 5 shows a perspective view of a vehicle interior with a centre console comprising a panel.

DETAILED DESCRIPTION

Figure 1A:
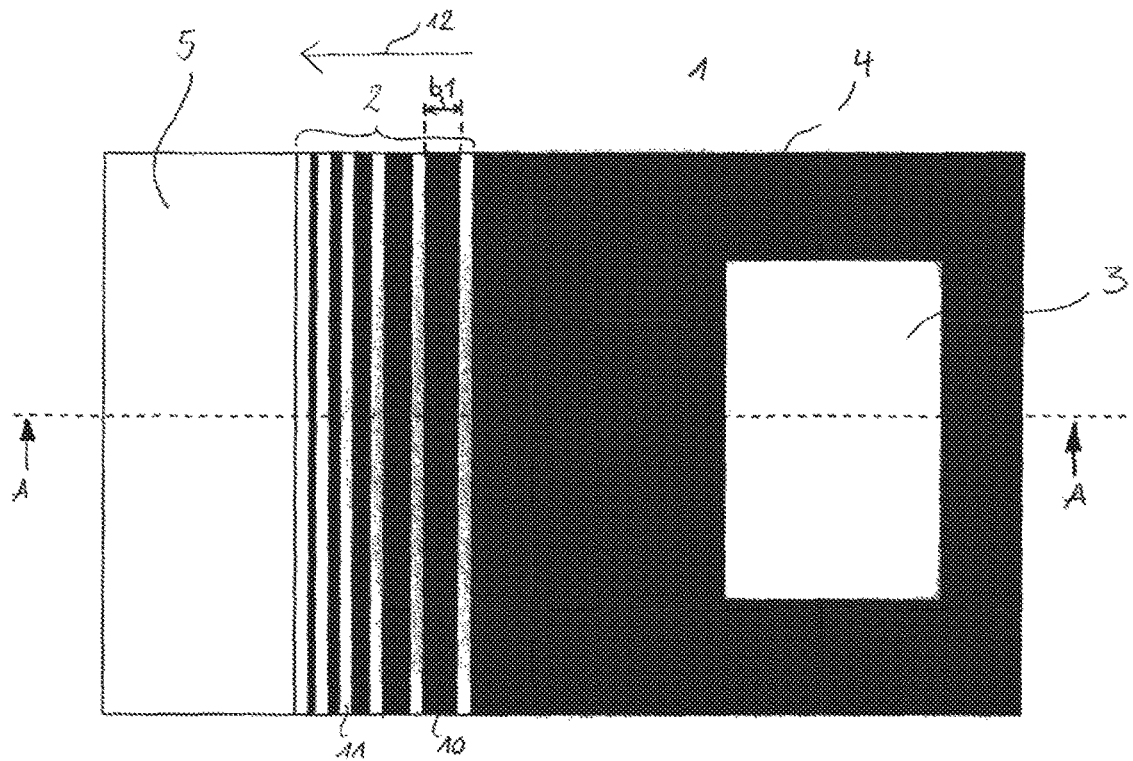
FIG. 1(a) shows a top view of a panel for a vehicle interior with a transition region according to embodiments of the disclosure.

FIG. 1(a) illustrates a panel 1 for a vehicle interior comprising a transition region 2, a display region 3, an opaque region 4 and a transparent region 5. The opaque region 4 surrounds the display region 3. In other embodiments, the panel 1 may comprise more than one display region 3 and/or more than one opaque region 4 and/or more than one transition region 2 and/or more than one transparent region 5. In a direction 12, the transition region has a width of at least 5 mm preferably at least 10 mm, more preferably at least 15 mm and/or at most 100 mm, preferably at most 90 mm, more preferably at most 80 mm. The transition region 2 comprises opaque areas, as an example one of the opaque areas is denoted with the reference sign 10. The opaque areas 10 have a decreasing width b1 in the direction 12. Thus, a light transmittance normal to a surface of the panel 1 increases in the direction 12 from the opaque region 4 towards the transparent region 5. The transition region 2 further comprises transparent areas, as an example one of the transparent areas is denoted with the reference sign 11. Alternatively or additionally the transition region 2 may have a gradual transition in the direction 12.

Figure 1B:
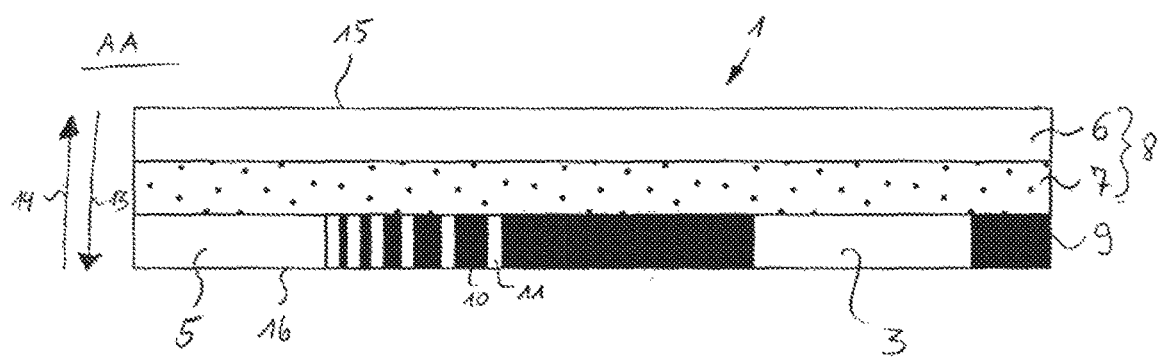
FIG. 1(b) shows a cross section of the panel of FIG. 1(a) with the transition region according to embodiments of the disclosure.

FIG. 1(b) shows a cross section AA of the panel shown in FIG. 1(a). Corresponding features are denoted using the same reference signs in FIG. 1(b) and the following figures. The panel 1 has a frontside 15 and a backside 16. A thickness of the panel 1 between the frontside and the backside may be 10 mm. In embodiments, the panel 1 has a rectangular shape. However, other embodiments may be bent or have other shapes following a contour of a carrier. Further, the panel 1 comprises a cover layer 8 that comprises a semi-transparent layer 6. In embodiments, the semi-transparent layer 6 consists of glass. The panel 1 can also comprise a semi-transparent layer 6 and/or a layer of the semi-transparent layer 6 made of another material, for example, a plastic such as PMMA. The semi-transparent layer may also be a mirror. The cover layer 8 may be bent by cold or by hot forming. In embodiments, the cover layer 8 has a light transmittance of, for example, 85 percent in a direction 13 and/or 14. Further, the cover layer 8 comprises an optically clear adhesive 7, for example Henkel®'s Loctite® LOCA or 3M™'s CEF OCA.

The optically clear adhesive 7 fixes the semi-transparent layer 6 to a mask layer 9. The mask layer 9 comprises opaque areas 10. In embodiments, the opaque areas 10 are formed by an opaque foil. The opaque areas 10 may also be formed by another opaque material, for example a varnish, an opaque plastic layer or a coloured glass. The mask layer also comprises transparent areas 11. In embodiments, the transparent areas 11 are formed by a transparent foil. In embodiments, the transparent areas 11 may be formed by cut-outs from the mask layer 9. Further, the mask layer 9 comprises a display region 3. In embodiments, the display region 3 is formed by the same foil as the opaque region, wherein the foil has transparent regions. In embodiments, the display region 3 may be formed by another transparent material or by a cut-out. Furthermore, a decorative element may be disposed on the backside 16 of the panel. The decorative element is visible from the frontside 15 when looking through the transparent regions 5 and/or through the transparent areas 11. The decorative element may comprise any material, for example leather, stones, wood, a decorative pattern or a textile.

Figure 2A:
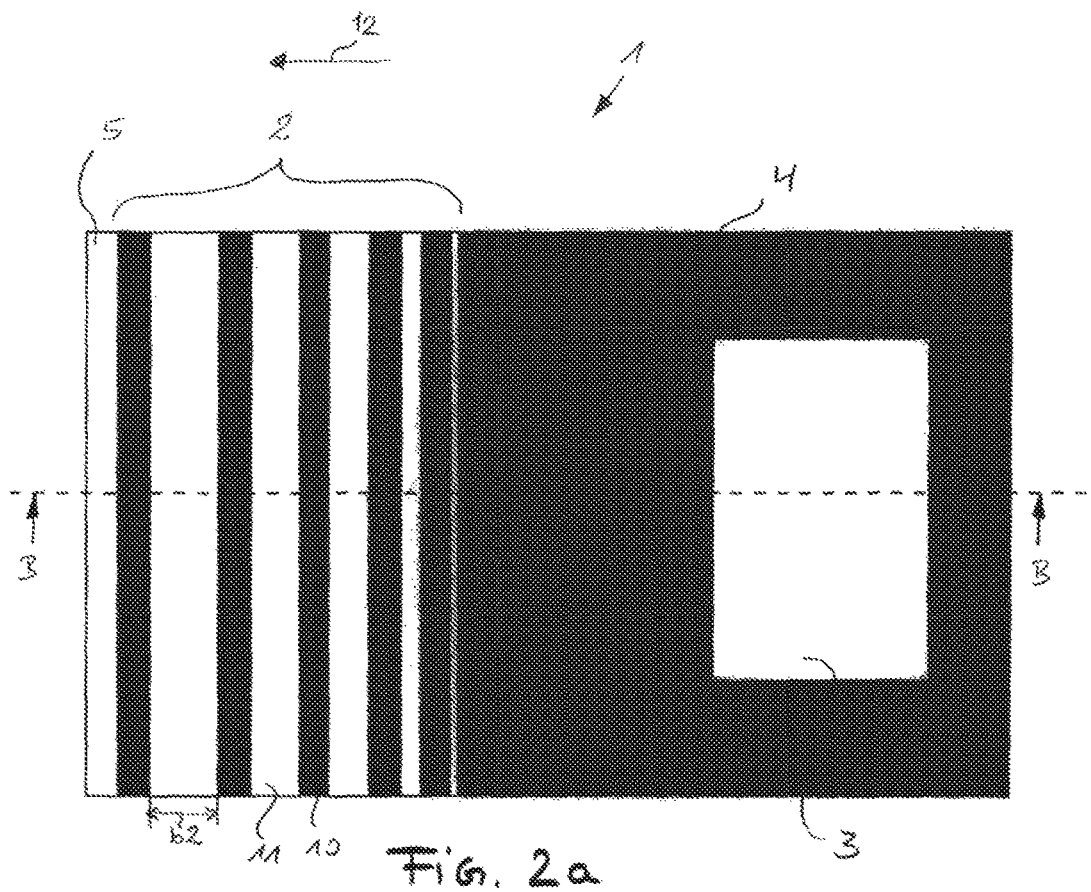
FIG. 2(a) shows a top view of a panel for a vehicle interior with a transition region according to embodiments of the disclosure.

Embodiments are shown FIG. 2(a). These embodiments correspond to the embodiments of FIG. 1(a) but differ in that the opaque areas 10 have a similar or the same width. The transparent areas 11 have an increasing width b2 in the direction 12. Thus, a light transmittance of the panel 1 increases in the direction 12 from the opaque region 4 towards the transparent region 5.

Figure 2B:
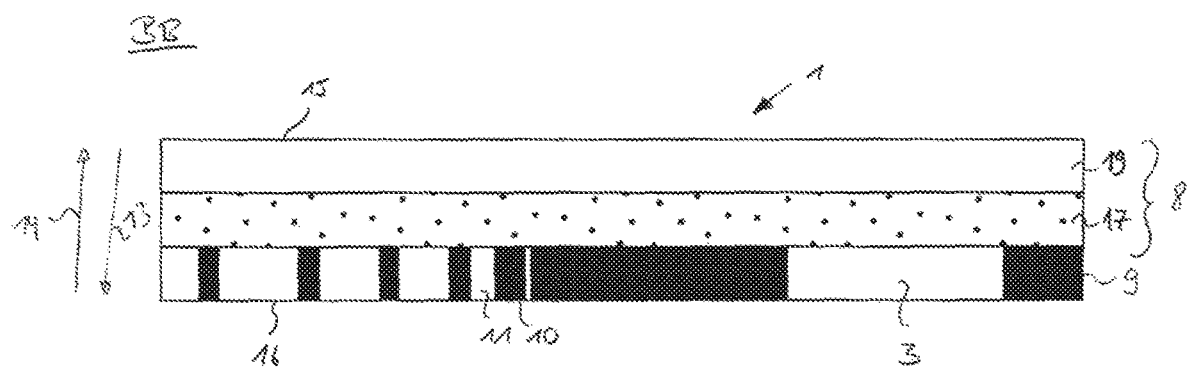
FIG. 2(b) shows a cross section of the panel of FIG. 2(a) with the transition region according to embodiments of the disclosure.

FIG. 2(b) shows a cross section BB of the panel shown in FIG. 2(a). Further, the embodiments shown in FIG. 2(b) differs in that the cover layer 8 comprises a glass layer 19 made of transparent and/or coloured glass, for example, Soda Lime Glass or Aluminosilicate glass. In this example, the cover layer 8 has a light transmittance of 55 percent in the direction 13 and/or 14. In embodiments, the cover layer 8 is not bent. In other embodiments, the cover layer 8 may be bent by cold or hot forming. Further, the cover layer 8 comprises a semi-transparent layer 17. The semi-transparent layer 17 can be a semi-transparent, optionally self-adhesive foil or can consist of a layer of semi-transparent adhesive. In embodiments, the opaque areas 10 of the mask layer 9 are made of an opaque varnish. In embodiments, the opaque areas 10 may comprise another opaque material. In embodiments, the transparent areas 11 are formed by a transparent varnish. In embodiments, the transparent areas 11 may be formed by openings where no varnish is applied or by another transparent material. In other embodiments, the mask layer is ink-printed on the backside of the semi-transparent layer.

Figure 3A:
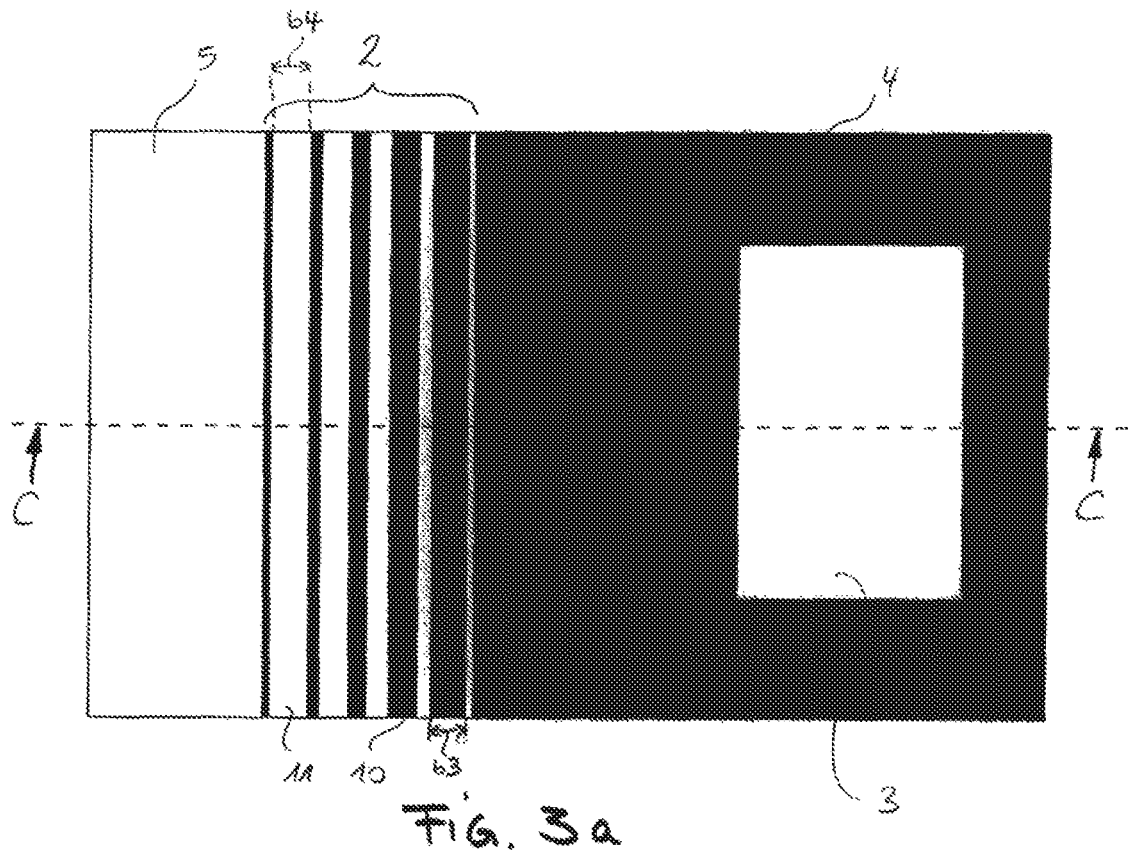
FIG. 3(a) shows a top view of a panel for a vehicle interior with a transition region according to embodiments of the disclosure.

Embodiments are illustrated in FIG. 3(a). These embodiments correspond to the embodiments of FIG. 1(a) and/or FIG. 2(a) but differ in that the opaque areas 10 have a decreasing width b3 in the direction 12 and the transparent areas 11 have an increasing width b4 in the direction 12. The width amounts at most 10 mm, preferably a most 5 mm, more preferably at most 2 mm and/or at least 0.01 mm, preferably at least 0.05 mm more preferably at least 0.1 mm. Thus, a light transmittance of the panel 1 increases in the direction 12 from the opaque region 4 towards the transparent region 5.

Figure 3B:
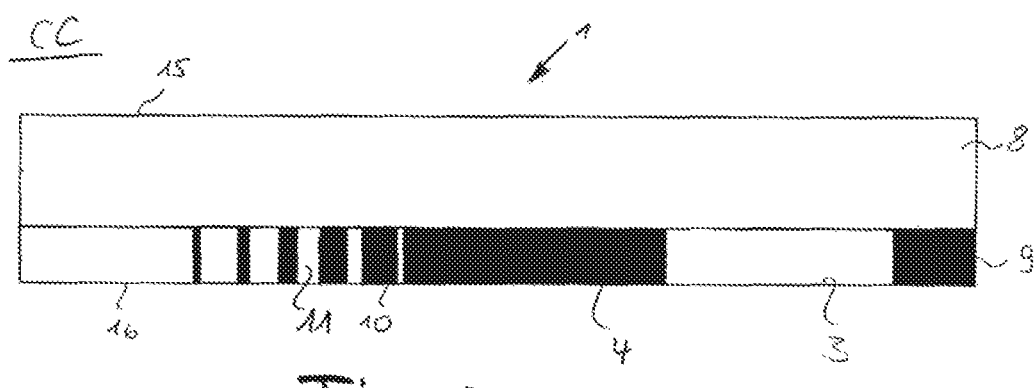
FIG. 3(b) shows a cross section of the panel of FIG. 3(a) with the transition region according to embodiments of the disclosure.

FIG. 3(*b*) shows a cross section CC of the panel shown in FIG. 3(*a*). In embodiments, the cover layer 8 comprises only a single layer which acts as a semi-transparent layer. In embodiments the cover layer 8 is made of glass. In embodiments the cover layer 8 may be made of another material, for example PMMA. In embodiments, the cover layer 8 is not bent. Alternatively, the cover layer may be bent by hot forming or by cold forming. In embodiments the cover layer 8 is attached to the mask layer by clamping (clamps are not shown). In other embodiments the cover layer 8 may be attached to the mask layer by other means, for example, by gluing. The transparent region 5, the display region 3 and the transparent areas 11 are cut-outs.

Embodiments are shown in FIG. 4(*a*). These embodiments correspond to the embodiments of FIG. 1(*a*), FIG. 2(*a*) and/or FIG. 3(*a*) but differ in that the opaque areas 10 are circles. In other embodiments, the opaque areas 10 may also have another shape. The diameter of the opaque areas 10 decreases in the direction 12. For example, the diameter decreases in the direction 12 in ranges of at least 0.01 mm and/or at most 4 mm, preferably at least 0.05 mm and/or at most 3 mm, more preferably at least 0.01 mm and/or at most 2 mm. Thus, the light transmittance increases in the direction 12.

FIG. 4(*b*) shows a cross section DD of the panel shown in FIG. 4(*a*). The cover layer 8 comprises a semi-transparent foil 18 and a glass layer 6. The foil 18 has a light transmittance of, for example, 65 percent. In embodiments, the foil 18 is mass tinted. The foil may be coloured by other means, for example, by painting.

FIG. 5 shows a perspective view of a vehicle interior 20 with a centre console comprising a panel 21. Two displays 26 are carried by a carrier 25. The carrier is a milled aluminium frame. In embodiments a cover layer 22 consists of a glass layer which is laminated with a semi-transparent foil, for example, 3M™'s Prestige 40. However, in different embodiments the cover layer may comprise more layers. The cover layer 22 covers the displays and the first decorative element 23. The glass layer has a thickness of 0.4 mm and is made of an AlSi glass. The laminated semi-transparent foil is ink-jet printed for a pattern on the backside of the foil. The thereby generated ink layer forms the mask layer. The cover layer has a light transmittance of 67 percent. The cover layer 22 is bent by cold forming. The cover layer 22 is glued to the frame with, for example, 3M™'s Very High Bond double sided tape. A first decorative element 23 is embedded in the carrier 25. In embodiments, the first decorative element 23 is transparent and glued on the carrier 25. In embodiments, the first decorative element 23 is made of a transparent plastic, for example, PC or PMMA and is bent. Optionally, a second decorative element 24 can be positioned underneath the first decorative element 23 to show a decorative material, such as wood, leather or carbon fibre. The optional second decorative element 24 may be fixed to the first decorative element 23 by gluing. In embodiments, the decorative element 24 is removed in order to use transparency for decorative purposes. The displays 26 are arranged into two frame cut-outs 27 of the carrier 25. In embodiments, two AMOLED displays are used. However, in other embodiments other displays can be used. Further, the number of two displays is optional. In embodiments, the displays are fixed to the glass layer using an optically clear adhesive. However, the displays can be fixed by clamping or any assembly mean.

We claim:

1. A panel for a vehicle interior comprising a cover layer and a mask layer, wherein the cover layer has a frontside and a backside, and the mask layer is disposed at the backside of the cover layer, the cover layer comprises a semi-transparent layer, and the cover layer has a light transmittance of at most 90 percent in a direction perpendicular to the frontside, wherein the mask layer comprises a transparent display region and an opaque region, wherein the opaque region is located adjacent to the display region, wherein the mask layer comprises a transparent region and a transition region, wherein the transition region is disposed between the transparent region and the opaque region and the light transmittance increases in the transition region in a direction from the opaque region towards the transparent region.

2. The panel of claim 1, characterised in that the semi-transparent layer is made of glass or covered by a glass layer.

3. The panel of claim 2 characterised in that at least one layer of the cover layer is bent by cold forming.

4. The panel of claim 2, characterised in that at least one layer of the cover layer is bent by hot forming.

5. The panel of claim 1, characterised in that the display region (3) is formed by an opening or a transparent material.

6. The panel of claim 1, characterised in that the semi-transparent layer has a light transmittance of at least 20 percent in the direction perpendicular to the frontside.

7. The panel of claim 1, characterised in that the transition region comprises a gradual transition.

8. The panel of claim 1, characterised in that the panel comprises a carrier that supports the cover layer.

9. The panel of claim 8, characterised in that the carrier is transparent.

10. The panel of claim 1, characterised in that the panel comprises a display disposed underneath the display region.

11. A vehicle interior trim part, comprising the panel of claim 1.

* * * * *